(12) United States Patent
Long et al.

(10) Patent No.: US 12,202,033 B2
(45) Date of Patent: Jan. 21, 2025

(54) METHOD FOR MANUFACTURING A SHELL MOULD FOR THE MANUFACTURE OF AERONAUTICAL METAL COMPONENTS BY LOST-WAX CASTING

(71) Applicant: SAFRAN, Paris (FR)

(72) Inventors: Ming Long, Paris (FR); Ngadia Taha Niane, Moissy-Cramayel (FR); Hugues Denis Joubert, Moissy-Cramayel (FR); Heni Hachani, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/698,138

(22) PCT Filed: Sep. 29, 2022

(86) PCT No.: PCT/FR2022/051838
§ 371 (c)(1),
(2) Date: Apr. 3, 2024

(87) PCT Pub. No.: WO2023/057705
PCT Pub. Date: Apr. 13, 2023

(65) Prior Publication Data
US 2024/0399444 A1    Dec. 5, 2024

(30) Foreign Application Priority Data
Oct. 7, 2021  (FR) ...................... 2110619

(51) Int. Cl.
*B22C 7/02*  (2006.01)
*B22C 9/04*  (2006.01)
(Continued)

(52) U.S. Cl.
CPC ................. *B22C 7/02* (2013.01); *B22C 9/04* (2013.01); *B22C 9/08* (2013.01); *B33Y 80/00* (2014.12)

(58) Field of Classification Search
CPC .............. B22C 7/02; B22C 9/08; B22C 9/082
See application file for complete search history.

(56) References Cited

U.S. PATENT DOCUMENTS

| 4,064,927 A | * | 12/1977 | Ostrowski | ................. B22C 7/02 164/249 |
| 4,356,859 A | | 11/1982 | Savage | |
| 2015/0027653 A1 | | 1/2015 | Guerche et al. | |

FOREIGN PATENT DOCUMENTS

| FR | 3031921 A1 | 7/2016 |
| FR | 3089438 A1 | 6/2020 |
| GB | 912700 A | * 12/1962 |

OTHER PUBLICATIONS

Search Report and Written Opinion issued in International Application No. PCT/FR2022/051838, mailed Jan. 25, 2023.

(Continued)

*Primary Examiner* — Kevin E Yoon
(74) *Attorney, Agent, or Firm* — Bookoff McAndrews, PLLC (57) ABSTRACT

A method for manufacturing a shell mold intended for manufacturing at least one metal part by lost-wax casting, the shell mold including at least one molding cavity intended for molding the metal part, and at least one feed channel intended to convey a liquid metal to the molding cavity, the method including manufacturing a wax pattern including a part pattern intended to form the molding cavity and a feed channel pattern intended to form the feed channel, arranging at least one ceramic insert around at least a portion of the feed channel pattern, and manufacturing the shell mold around the wax pattern.

14 Claims, 6 Drawing Sheets

(51) Int. Cl.
*B22C 9/08* (2006.01)
*B33Y 80/00* (2015.01)

(56) References Cited

OTHER PUBLICATIONS

Search Report issued in French Application No. 2110619, mailed Apr. 19, 2022.

* cited by examiner

METHOD FOR MANUFACTURING A SHELL MOULD FOR THE MANUFACTURE OF AERONAUTICAL METAL COMPONENTS BY LOST-WAX CASTING

CROSS-REFERENCE TO RELATED APPLICATIONS

This is a National Stage Application under 35 U.S.C. § 371 of International Application No. PCT/FR2022/051838, filed Sep. 29, 2022, now published as WO 2023/057705 A1, which claims priority to French Patent Application No. 2110619, filed on Oct. 7, 2021.

TECHNICAL FIELD

The present disclosure relates to the manufacturing of aeronautical parts by casting, in particular turbomachine blades, using the lost-wax casting technique. In particular, the present disclosure relates to a method for manufacturing a shell mold intended for manufacturing turbomachine parts using the lost-wax casting technique.

PRIOR ART

Lost-wax or investment casting methods have been known, in and of themselves, since Antiquity. Such a method is described, for example, in document FR3031921. They are particularly well suited to manufacturing metal parts with complex shapes. Investment casting is therefore used, in particular, for manufacturing turbomachine blades or impeller sectors. In investment casting, the first step is normally that of manufacturing a wax pattern, which generally comprises producing a pattern from a material with a comparatively low melting temperature, such as a wax or a resin, for example, around which a shell of refractory material is then produced.

This wax pattern is manufactured by injection into specific tools, for example wax injection molds. Several wax patterns are thus produced and then assembled so as to obtain a pattern that can be in the form of a cluster, modeling an assembly of a plurality of parts to be manufactured. After destroying the pattern, most often by draining out the material of the pattern from inside the shell mold, thus giving this method its name, molten metal is poured into this shell mold in order to fill the cavity formed by the pattern in the mold after it has been drained out. When the metal cools and solidifies, the shell mold can be destroyed in order to recover a metal part, or the cluster of metal parts, conforming to the shape of the pattern.

In order to produce the shell mold, the wax pattern is generally dipped in a casting slurry, then coated with sand and dried. These operations may be repeated in order to form several layers and obtain the desired thickness and mechanical resistance of the shell mold.

The shell mold obtained in the form of a cluster conventionally has several portions, in particular a plurality of molding cavities each intended to mold a metal part of the cluster of parts, a feed bucket through which the molten metal is poured, a central feed channel descending towards the bottom of the shell from the bucket, and a plurality of source feed ducts for feeding each of the molding cavities.

However, some regions of this shell mold are fragile, which can be a source of problems. In particular, the source feed ducts are a fragile region for several reasons. These ducts are thin and curved, and are situated in a region with a strong thermal gradient. This means that they are subject to high levels of stress. During the preheating phase in particular, the rapid increase in temperature increases the thermal gradients between the inner and outer faces of the feed ducts, and therefore the thermal stresses/deformations in this region. The gradients can reach several tens of degrees per millimeter.

Moreover, during filling, the liquid alloy reaches a high speed, inducing considerable shear forces that can cause the shell to be eroded, thus resulting in inclusions in the parts. Indeed, the liquid alloy can reach speeds of approximately 1.5 to 2 m/sec in this region, whereas the rules of the trade set a speed limit of approximately 0.4 to 0.8 m/sec, above which there is a proven risk of erosion of the shell. Lastly, obtaining a shell of nominal thickness, and therefore with nominal mechanical properties, is difficult with the current state of existing methods, including dipping and stuccoing.

As a result of these stresses, cracks can occur in the source feed ducts when the molten metal is poured. These cracks can cause liquid metal to spill out of the cluster. This spilling can damage the furnace, which needs to be serviced to return to full working order. Furthermore, if a large volume of alloy has spilled out, the volume of the molding cavities cannot be completely filled, meaning that, after solidification, the final parts may be non-compliant.

DISCLOSURE OF THE INVENTION

The aim of the present disclosure is to propose a method for manufacturing a shell mold that helps limit or indeed eliminate the abovementioned problems.

This aim is achieved, according to the present disclosure, by virtue of a method for manufacturing a shell mold intended for manufacturing at least one metal part, in particular a turbomachine part, by lost-wax casting, the shell mold comprising at least one molding cavity intended for molding the metal part, and at least one feed channel intended to convey a liquid metal to the molding cavity, the method comprising:

- manufacturing a wax pattern comprising a part pattern intended to form the molding cavity and a feed channel pattern intended to form the feed channel,
- arranging at least one ceramic insert around at least a portion of the feed channel pattern,
- manufacturing the shell mold around the wax pattern.

In certain embodiments, manufacturing the wax pattern comprises injecting a liquid wax into an intermediate mold and then hardening the wax and, before injecting the liquid wax, arranging the at least one ceramic insert in the intermediate mold such that, after the wax has hardened, the insert is arranged around at least one portion of the feed channel pattern. Alternatively, the insert may be arranged around the portion of the feed channel pattern after the wax has hardened. In this case, the insert may comprise two half-shells each arranged to either side of the feed channel and bonded together so as to surround the latter.

It should be understood that the shape of the wax pattern of the part is identical to the shape of the final metal part that needs to be obtained at the end of the method for manufacturing by lost-wax casting. Therefore, if the part to be manufactured is a turbine blade, for example, the part pattern of the wax pattern will have the shape and the dimensions of this turbine blade. As a result, the inner walls of the molding cavity of the shell mold formed around the part pattern allow a turbine blade with the desired dimensions to be formed, by pouring a liquid metal into this molding cavity.

Similarly, the feed channel pattern of the wax pattern has the shape of the internal passage section of the feed channel of the shell mold, through which the liquid metal can flow to the molding cavity, for example. Therefore, with the insert arranged around at least a portion of the feed channel pattern, the liquid metal will also flow inside the insert.

More precisely, when installing the tools, in particular the intermediate mold, enabling the injection of the liquid wax and the formation of the feed channel pattern, the insert is arranged such that, after the wax has solidified and the wax pattern has been removed from the mold by dismantling the intermediate mold, the ceramic insert remains around the portion of the feed channel pattern.

The shell mold is then manufactured around the wax pattern (after assembling the various wax patterns in such a way as to form a cluster pattern from wax), by successively dipping the wax pattern in a slurry, in order to obtain a ceramic shell mold. When the shell mold is being manufactured by dipping, the successive layers of the shell mold are formed around the wax pattern, but also around the insert that is already initially present and is itself arranged around the wax feed channel pattern. Therefore, when the manufacture of the shell mold is complete, the wall of the feed channel has a local thickening caused by the presence of the insert. More precisely, at the region comprising the insert, the wall of the feed channel has a thickness corresponding to the thickness of the layers formed by successive dips in the slurry plus the thickness of the ceramic insert around which these layers have been formed.

Therefore, at the end of the method for manufacturing the shell mold, the ceramic insert is embedded in and integrated into the final shell mold, which is itself made from ceramic. It is therefore possible to arrange the insert in a desired region of the feed channel, in particular a critical and highly fragile region, so as to locally increase the thickness of ceramic around this critical region of the feed channel. This helps locally improve the mechanical properties of the ceramic shell at high temperatures, and therefore its resistance to thermal and fluid stresses.

In certain embodiments, the insert comprises a body in the form of a ring surrounding the feed channel pattern.

In certain embodiments, the shape of an inner wall of the body of the insert is identical to the shape of an outer wall of the portion of the feed channel pattern around which the insert is arranged.

It should be understood that the body of the insert is ring-shaped and extends around a central axis of the insert. The body of the insert extends axially, along the central axis of the insert, over at least one portion of the feed channel pattern, and around the latter. The thickness of the body of the insert corresponds to its radial dimension, in a direction perpendicular to the central axis of the insert, making it possible to obtain the local thickening along the feed channel in the final shell mold. It should also be understood that, when the insert is arranged around the feed channel pattern, the central axis of the insert coincides with the axis of said feed channel pattern. The central axis of the insert may be straight, such that the body of the insert has a cylindrical shape, or may be curved, so as to follow the curvature of the feed channel. This shape of insert has the advantage of being simple to implement.

In certain embodiments, the body of the insert has an inner diameter equal to the outer diameter of the feed channel pattern intended to form the feed channel of the shell mold.

In other words, after manufacturing the shell mold and eliminating the wax, the inner diameter of the body of the insert is equal to the inner diameter of the passage section of the feed channel. This helps limit the disturbance of the liquid metal as it flows through the feed channel.

In certain embodiments, the length of the body of the insert is substantially equal to half the length of the feed channel pattern around which the insert is arranged.

The expression "length of the body of the insert" should be understood to mean its axial length along its central axis or, in other words, along the axis of the feed channel pattern. When the feed channel pattern is curved, the central axis of the insert therefore also being curved, the curvilinear length of the latter is also substantially equal to half the length of the feed channel pattern around which the insert is arranged. This feature helps improve the effectiveness of the insert.

In certain embodiments, an inner wall of the body of the insert comprises a neck. The term "neck" should be understood to mean a narrowing of the cross section of the body of the insert, along its central axis. Therefore, the inner passage of the insert has a converging portion followed by a diverging portion along its central axis. The presence of the neck helps better control the flow of liquid metal during filling, by slowing the flow at the bottom of the feed channel where the speeds are highest. As an alternative, or in addition to the neck, the inner wall of the body of the insert may comprise disruptors, for example protrusions intended to disrupt and slow the liquid alloy during filling.

In certain embodiments, the insert comprises at least one annular anchoring bead arranged around the body of the insert.

According to this configuration, the outer wall of the insert is not flat, but has a local protrusion due to the presence of the annular anchoring bead. This anchoring bead may be in the form of an annular flange surrounding the body or, in other words, extending around its central axis. The anchoring bead helps to limit the movement of the insert in the shell mold after removing the wax, and therefore to improve the positioning and the anchoring of the insert in the shell mold.

In certain embodiments, the anchoring bead is arranged at an axial end of the body of the insert.

In certain embodiments, the anchoring bead is arranged at an intermediate position between two axial ends of the body of the insert.

The term "axial end" should be understood to mean an end of the body of the insert according to its central axis. When manufacturing the insert, the axial position of the anchoring bead along the body of the insert may be determined depending on the configuration of the cluster, so as to limit the creation of ceramic bridges when manufacturing the shell.

In certain embodiments, the anchoring bead has a straight portion extending radially from the body of the insert, and a toroidal portion arranged around the straight portion.

The term "radially" should be understood to refer to a radial direction, i.e., a direction perpendicular to the central axis of the insert. Therefore, the toroidal portion is arranged radially outside the straight portion, and around it. It should also be understood that, in a view perpendicular to a longitudinal section plane of the insert, parallel to its central axis, the straight portion has a substantially rectangular shape, and the toroidal portion has a circular arc shape, with a diameter greater than the width of the straight portion. The presence of the toroidal portion helps improve the anchoring of the insert in the shell.

In certain embodiments, the anchoring bead extends radially from the body of the insert by at least 3 mm. This dimension helps to improve the anchoring of the insert in the shell and to keep it in position after dewaxing.

In certain embodiments, the ceramic insert is manufactured by additive manufacturing. This manufacturing process makes it possible to design insert profiles with complex shapes, in particular the presence of a toroidal portion on the anchoring bead, or a neck in the inner cross section of the insert.

In certain embodiments, the shell mold is intended for manufacturing a cluster of metal turbomachine parts, the shell mold being axisymmetric about a central axis and comprising a plurality of molding cavities each intended to mold one of the metal parts, the feed channel comprising a central feed channel descending along the central axis of the mold and configured to receive molten metal at a top end, and a plurality of source feed ducts each bringing a bottom end of the central feed channel into fluid communication with a base of each of the molding cavities, a plurality of ceramic inserts being arranged in the intermediate mold such that, after the wax has hardened, each of the inserts is arranged around at least a portion of a source feed duct pattern intended to form one of the source feed ducts of the shell mold.

In this case, the source feed ducts constitute the critical regions that need to be reinforced in order to limit the risk of the shell mold cracking in these regions when the liquid metal is poured. The shell mold preferably comprises as many inserts as it comprises source feed ducts. In other words, when manufacturing the wax pattern, each source feed duct pattern is at least partially surrounded by an insert. Therefore, after manufacturing the shell mold in the form of a cluster, the source feed ducts of the shell mold each have a local thickening, given the presence of the inserts, helping to increase the mechanical and thermal resistance of the mold in these regions.

In certain embodiments, the length of the body of the insert is substantially equal to half the length of the source feed duct pattern around which the insert is arranged.

In certain embodiments, the source feed ducts have curvature, a central axis of the inserts having curvature identical to the curvature of the source feed ducts.

The present disclosure also relates to a shell mold intended for manufacturing a metal turbomachine part, obtained by a method according to any one of the preceding embodiments.

The present disclosure also relates to a method for manufacturing metal turbomachine parts using a shell mold obtained by a method according to any one of the preceding embodiments.

BRIEF DESCRIPTION OF THE DRAWINGS

The invention and its advantages will be better understood upon reading the following detailed description of different embodiments of the invention given by way of non-limiting examples. This description refers to the appended pages of figures in which.

DESCRIPTION OF THE EMBODIMENTS

Figure 1:
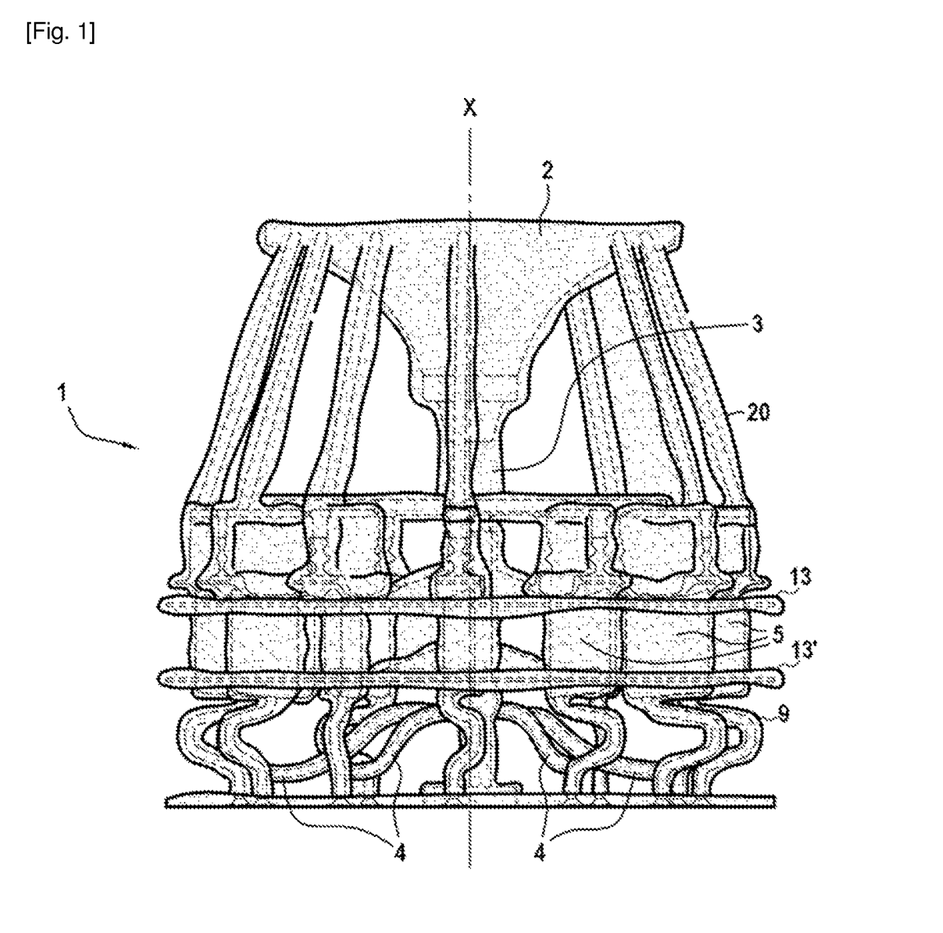
FIG. 1 is a side view of a shell mold obtained by a lost-wax casting method according to the prior art.

Hereinafter in the disclosure, the terms "top" and "bottom" and their derivatives are understood to refer to the orientation of the shell mold in space during the casting step and as shown in FIG. 1, and according to the direction in which liquid metal is poured into it by force of gravity.

FIG. 1 shows an example of a ceramic shell mold 1, referred to hereinafter simply as "shell 1", which is obtained by a method according to the present disclosure, and can be used to manufacture aeronautical parts, for example fixed or mobile turbine or compressor blades, in clusters, by casting.

At its top end, the shell 1, in the form of a cluster, comprises a feed bucket 2 through which liquid metal can be poured. The feed bucket 2 communicates with a top end of a central feed channel 3 extending vertically along a central axis X of the shell 1. The bottom end of the central feed channel 3 communicates with a plurality of source feed ducts 4 distributed circumferentially around the central axis X of the shell 1, in a bottom part thereof. The shell 1 further comprises a plurality of molding cavities 5 distributed circumferentially around the central axis X of the shell 1. Each molding cavity 5 is intended to form a metal aeronautical part. It can be seen in FIG. 1 that the cavities allowing the different metal parts of the cluster to be molded are shown as dashed lines in the shell 1.

Each of the source feed ducts 4 has a curved shape allowing the bottom end of the central feed channel 3 to be brought into fluid communication with a base 9 of one of the molding cavities 5. Therefore, pouring liquid metal into the feed bucket 2 makes it possible, after the liquid metal has flowed through the central feed channel 3 and into each of the source feed ducts 4, to fill each of the molding cavities 5 from the bottom. The shell 1 may also comprise top 13 and bottom 13' thermal screens, and stiffeners 20.

Figure 2:
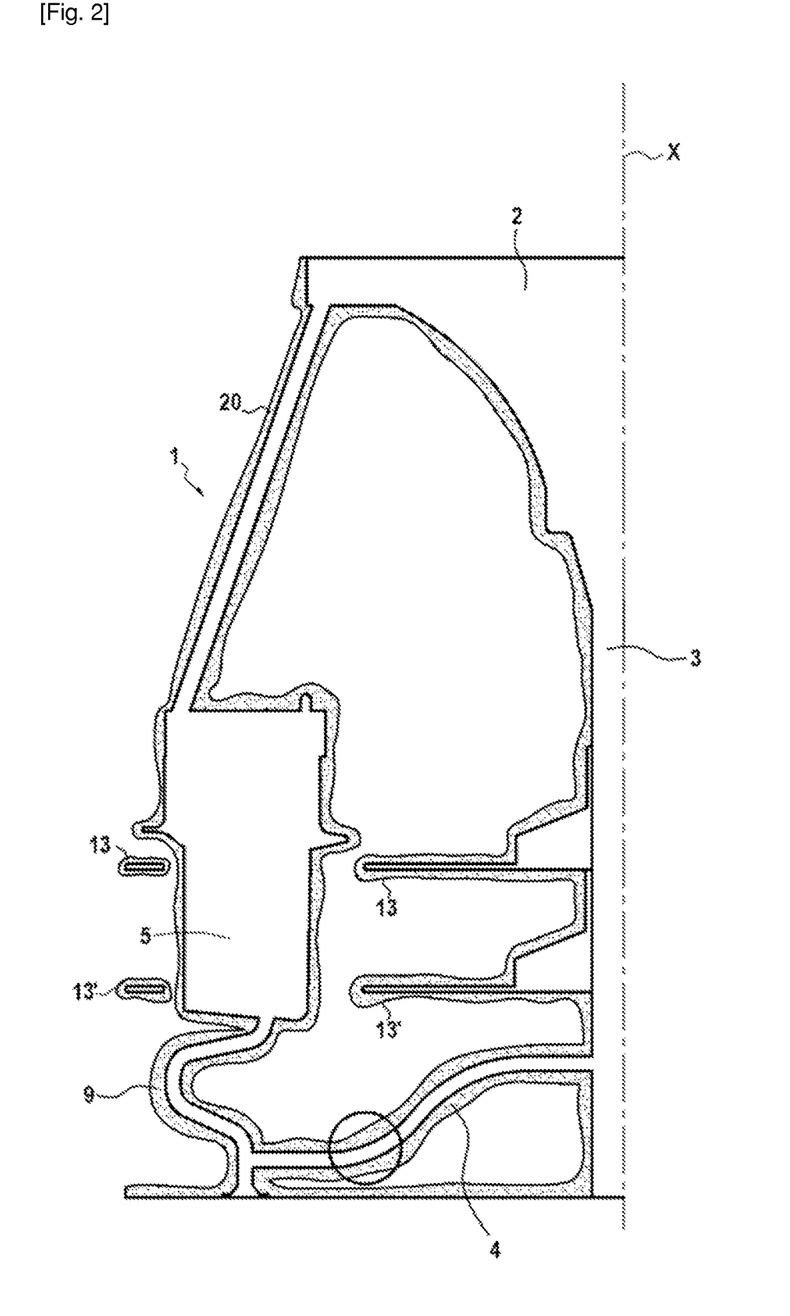
FIG. 2 is a view of half of the shell mold of FIG. 1 in axial section.

The source feed ducts 4, in particular the curved parts thereof, constitute fragile regions of the shell 1 which are susceptible to cracking when the metal is cast, and which the method according to the present disclosure helps to reinforce. Such a fragile region is shown by a circle in FIG. 2.

Figure 10:
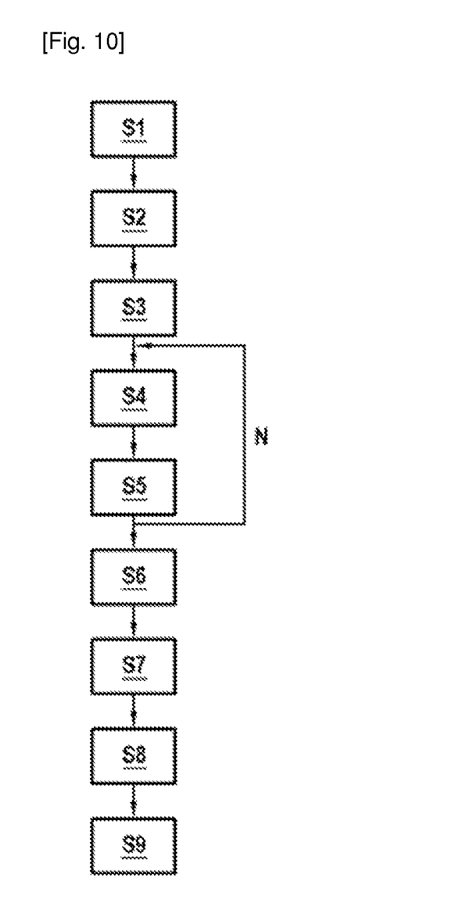
FIG. 10 shows, in schematic form, the steps of a method for manufacturing a shell mold and metal parts according to the invention, by lost-wax casting.

The remainder of the description describes a method for manufacturing the shell 1 shown in FIG. 1 and aeronautical metal parts by means of this shell 1. The different steps of this method are shown in FIG. 10.

The first step (step S1) comprises manufacturing a pattern of the part from wax or another wax-equivalent material that can easily be removed later. The wax pattern is also referred to as a "non-permanent cluster". It should be noted that, hereinafter in the disclosure, the term "wax pattern" refers to the complete pattern, in the form of a cluster that can be used to obtain the shell mold in the next step, it being understood that this wax pattern is actually the result of assembling several wax pattern portions, as explained in greater detail later in the description. In a second step, the wax pattern is dipped in a first slurry, the contact slurry (step S2), comprising powder particles and a binder. Sanding, in other words a step of depositing particles of sand referred to as contact stucco, is then carried out, after which the obtained layer is dried (step S3). This sanding step helps reinforce the layer and facilitates the bonding of the next layer.

The layer obtained in this way is then dipped in a second slurry, referred to as the reinforcing slurry (step S4). A step of depositing particles of sand referred to as reinforcing stucco is then carried out, after which the obtained layer is dried (step S5). Steps S4 and S5 are repeated N times until a predetermined shell mold thickness is obtained. Finally, when the desired thickness is reached, a dewaxing step, which consists in removing the wax pattern, followed by heat treatment, is carried out (step S6). The wax is eliminated by placing the shell mold in an autoclave furnace (or the like) at a temperature higher than the melting temperature of the wax. After eliminating the wax pattern, a ceramic shell mold is obtained, the cavity of which reproduces, in negative, all of the details of the part to be molded.

In a next step, the cluster of metal blades is formed in the shell mold 1 by pouring molten metal into it through the feed bucket 2 (step S7). Next, after the metal in the shell 1 has cooled and solidified, the cluster is knocked out of the shell 1 (step S8). Finally, each of the metal aeronautical parts is separated from the rest of the cluster and is finished using finishing methods, for example machining methods (step S9).

The shell 1 is formed on completion of steps S1 to S6, and the metal parts are formed on completion of steps S7 to S9. Steps S2 to S9, which are known per se, will not be described in greater detail. For example, documents FR3089438 and FR3031921 describe these different steps in greater detail.

The invention focuses more specifically on step S1, which comprises manufacturing the wax pattern.

Manufacturing the wax pattern comprises injecting wax in liquid state into suitable tools, i.e., wax injection molds referred to hereinafter as intermediate molds (not shown here), then removing the wax from each of these intermediate molds after the wax has solidified. More precisely, the shape of each intermediate mold is similar to the shape of a portion of the ceramic shell 1 that is intended to be manufactured. Thus, after removing the wax pattern portions obtained by each of these intermediate molds from the molds, these different wax pattern portions are assembled in such a way as to form the complete wax pattern, i.e., in the form of a cluster that can then be used to manufacture the shell mold. It should be noted that the intermediate molds have a melting temperature lower than that of the shell 1 that is intended to be manufactured. The intermediate molds can therefore be made from metal.

Figure 4:
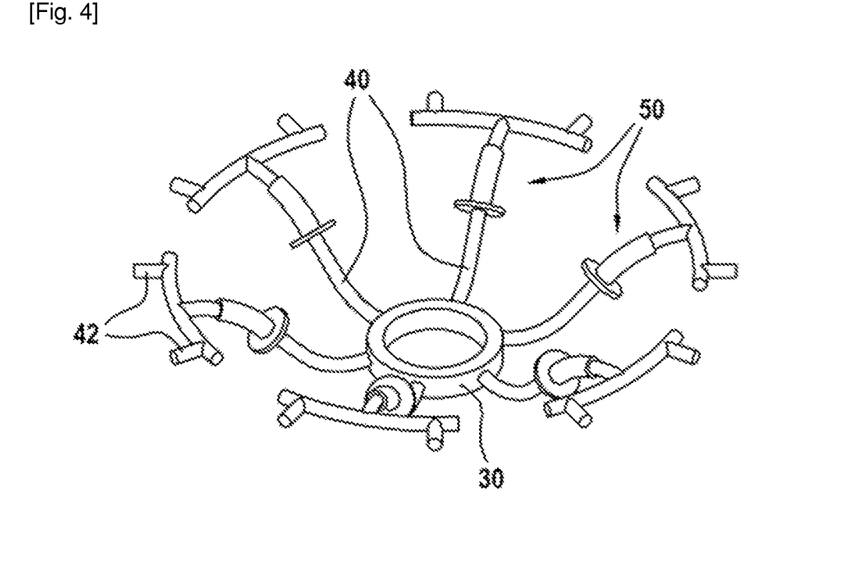
FIG. 4 is a perspective view of a portion of a wax pattern for forming the source feed ducts of a shell mold using a method according to the invention.

An intermediate mold can be used, in particular, to obtain the wax pattern of the source feed ducts 4 shown in FIG. 4. This intermediate mold comprises, in particular, passages for molding the wax patterns 40 of the source feed ducts 4, which are intended to form the source feed ducts 4. These passages each further comprise a housing in which a ceramic insert 50 is arranged. These housings may be formed, for example, in the intermediate mold by machining into the body of the mold. These housings ensure the correct initial positioning of the inserts 50 and keep them in position during the injection cycle. Each of the inserts 50 is thus arranged in this intermediate mold so that, after the wax has solidified and the wax pattern has been removed from the intermediate mold, the inserts 50 are arranged around the patterns 40 of the source feed ducts 4.

Figure 3:
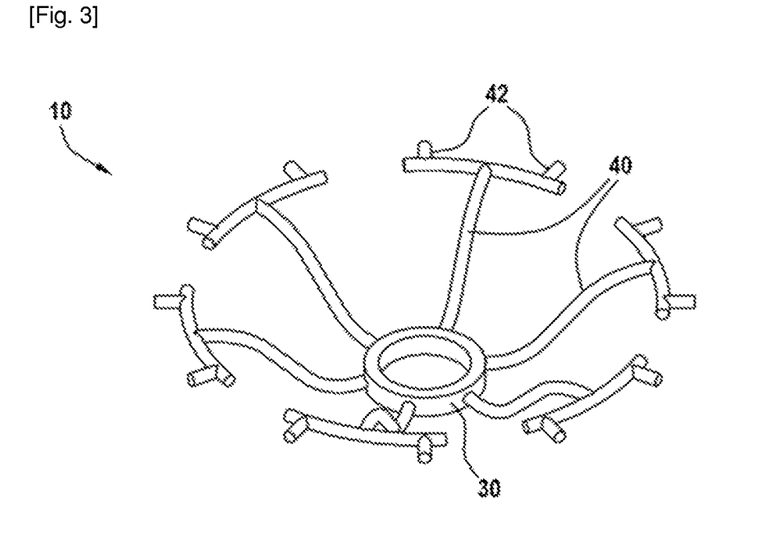
FIG. 3 is a perspective view of a portion of a wax pattern for forming the source feed ducts of the shell mold of FIG. 1.

FIG. 3 shows an isolated portion 10 of the wax pattern after removal from the mold and before assembly, in a standard configuration, without inserts arranged in the intermediate mold before the wax is injected. The isolated portion 10 of the wax pattern comprises a pattern 30 of the bottom end of the central feed channel 3, and a pattern 40 of the plurality of source feed ducts. The wax pattern also comprises distribution duct patterns 42 configured to form the distribution ducts used to distribute the liquid metal into the different bases 9 of the shell 1. The formation of the layers of ceramic around the patterns 40, by successive dips in the slurry, thus forms each of the source feed ducts 4.

FIG. 4 shows an isolated portion of the wax pattern after removal from the intermediate mold described above, and before this portion of the wax pattern has been assembled with the other portions of the wax pattern in order to obtain the wax cluster, in a configuration according to the present disclosure, comprising the arrangement of inserts 50 in the intermediate mold before the wax is injected. The isolated portion of the wax pattern comprises a pattern of the bottom end of the central feed channel 30, and a pattern 40 of the plurality of source feed ducts. Therefore, after the wax pattern has been removed from the mold, each insert 50 is fitted into a source feed duct pattern 40. The formation of the layers of ceramic around both the patterns 40 and the inserts 50, by successive dips in the slurry, forms the walls of each of the source feed ducts 4 surrounding said inserts 50.

Figure 5:
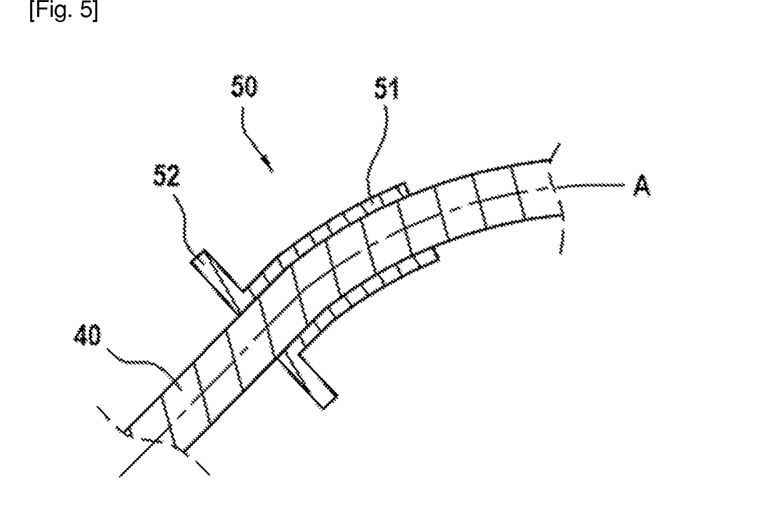
FIG. 5 is a view in axial section of a source feed duct pattern and an insert according to a first example of the invention.

FIG. 5 shows a cross-sectional view of an insert 50 only, arranged around a source feed duct pattern 40. The ceramic insert 50 can be obtained by additive manufacturing, and comprises a substantially cylindrical body 51 extending about a central axis A. The central axis A has a curvature corresponding to the curvature of the source feed duct pattern 40, around which the insert 50 is intended to be arranged after removing the wax pattern from the mold. It should be noted that the figures are provided for illustrative purposes and are not necessarily representative of the actual dimensions of the parts. Therefore, the insert 50 preferably has a curvilinear length along the central axis A that is substantially equal to half the length of the source feed duct pattern 40. Furthermore, a radial thickness of the body 51, i.e., in a direction perpendicular to the central axis A, is between 5 and 20% of the diameter of the passage section of the source feed duct 4. For example, for a source feed duct 4 whose passage section has a diameter of between 5 and 10 mm, the radial thickness of the body 51 is between 0.5 and 1 mm.

Figure 6:
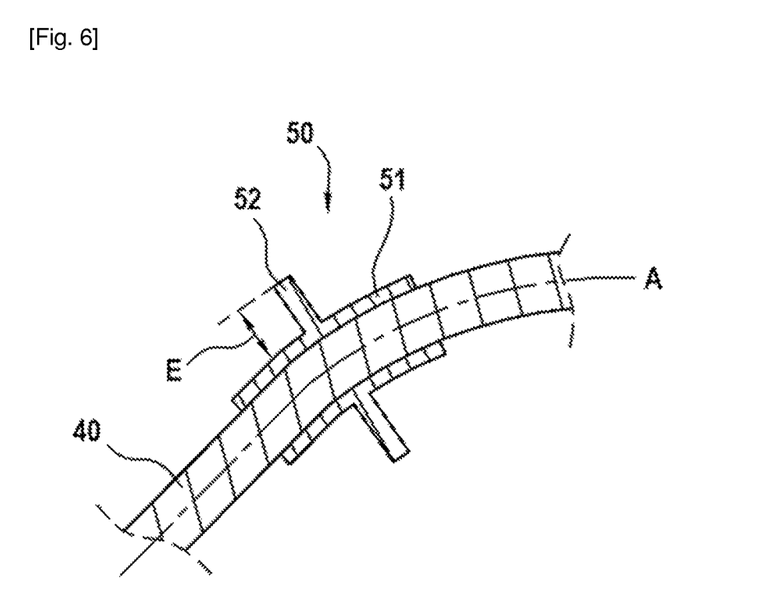
FIG. 6 is a view in axial section of a source feed duct pattern and an insert according to a second example of the invention.

The insert 50 comprises an annular anchoring bead 52 arranged around the body 51. The anchoring bead 52 is in the form of a flange with a rectangular cross section, extending radially from the body 51 over a length E of at least 3 mm. FIG. 5 shows an example in which the anchoring bead 52 is arranged at an axial end of the body 51 of the insert 50. FIG. 6 shows an alternative example in which the anchoring bead 52 is arranged on an intermediate axial section of the body 51, between the two axial ends thereof, in particular at a substantially equal distance from the two axial ends.

Figure 7:
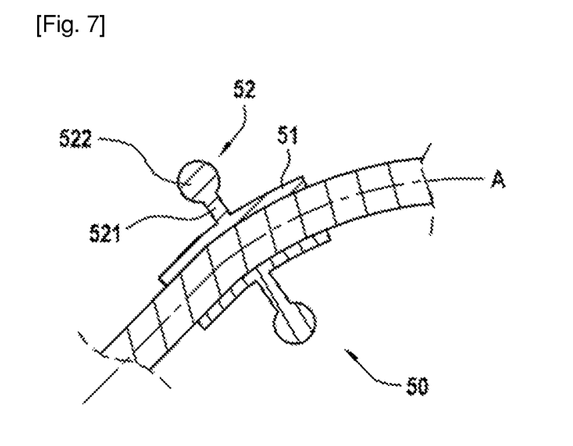
FIG. 7 is a view in axial section of a source feed duct pattern and an insert according to a third example of the invention.

FIG. 7 shows a modified example of an insert 50 according to the present disclosure, in which the anchoring bead 52 comprises a straight portion 521 arranged around the body 51 and extending radially from it, and a toroidal portion 522 arranged around the straight portion 521. The diameter of the toroidal portion 522 is greater than the axial thickness of the straight portion. The toroidal portion 522 therefore helps improve anchoring.

It should be noted that the dimensions and the positioning of the anchoring bead 52 can be determined depending on the configuration of the cluster, in order to avoid creating ceramic bridges in the shell 1, which would be detrimental to good thermal management during solidification. In particular, the dimensions and positioning of the anchoring bead 52 are preferably such that two surfaces of the unmolded cluster should be set apart by at least two to three times the thickness of the shell.

Figure 8:
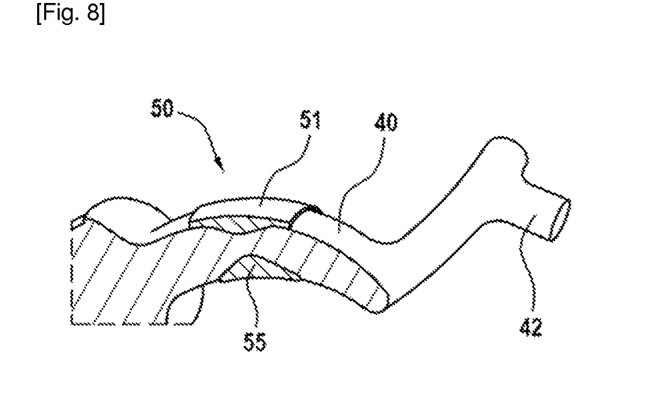
FIG. 8 is a perspective view in axial section of a source feed duct pattern and an insert according to a fourth example of the invention.

FIG. 8 shows another modified example of an insert 50 according to the present disclosure. Although the insert 50 is shown with no anchoring bead 52, in order to simplify the description, the insert 50 according to this example may nevertheless comprise an anchoring bead 52 similar to the abovementioned examples. According to this example, an inner wall of the body 51 of the insert 50 has a neck 55 corresponding to a local reduction in the passage section of the insert 50. It should be understood that the presence of this neck 55 also results, once the shell 1 has been manufactured, in a reduction in the passage section of the source feed ducts 4 and, therefore, in the presence of a converging portion and then a diverging portion in these ducts.

At the end of step S1, i.e., after removing the wax pattern from the intermediate mold, each of the source feed duct patterns 40 is surrounded by an insert 50 that has one of the configurations described in the examples above, or a combination of these configurations. At the end of steps S2 to S6 of manufacturing the shell 1, in particular after eliminating the wax, the inserts are integrated into the shell 1, in particular into the source feed ducts 4. They therefore create a local thickening at the curved portions of the source feed ducts 4. This configuration can be seen in FIG. 9, which shows the presence of a local thickening along a source feed duct 4, due to the presence of the ceramic insert 50, in contrast to the configuration shown in FIG. 2, in which no insert is present.

Figure 9:
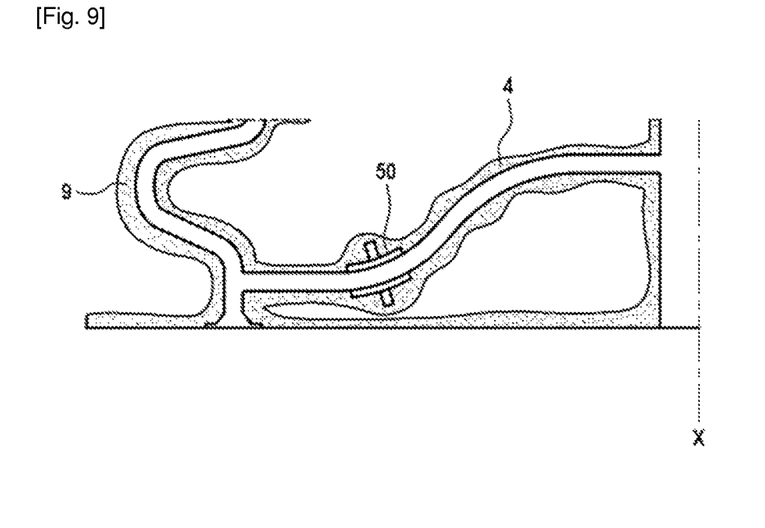
FIG. 9 is a view in axial section of half of a bottom part of a shell mold obtained by a method according to the invention.

It should be noted that there may be a clearance of approximately one tenth of a millimeter between the insert 50 and the shell 1 after removing the wax. However, this clearance does not affect the performances or the positioning of the insert 50 in the source feed ducts 4. On the contrary, the movements of the insert 50 caused by the passage of liquid metal can help slow the flow, which is beneficial for the filling of the molding cavities 5. This clearance also acts as a thermal insulator during the preheating phase.

Although the present invention is described in reference to specific embodiments, it is obvious that modifications and changes can be made to these embodiments without departing from the general scope of the invention as defined by the claims. In particular, individual features of the different embodiments that are shown/mentioned can be combined to form additional embodiments. Therefore, the description and the drawings should be regarded in an illustrative rather than a restrictive sense.

It is also obvious that all of the features described in reference to a method can be transposed, individually or in combination, to a device and, conversely, all of the features described in reference to a device can be transposed, individually or in combination, to a method.

The invention claimed is:

1. A method for manufacturing a shell mold intended for manufacturing at least one metal part by lost-wax casting, the shell mold comprising at least one molding cavity intended for molding the metal part, and at least one feed channel intended to convey a liquid metal to the molding cavity, the method comprising:
    manufacturing a wax pattern comprising a part pattern intended to form the molding cavity and a feed channel pattern intended to form the feed channel,
    arranging at least one ceramic insert around at least one portion of the feed channel pattern,
    manufacturing the shell mold around the wax pattern.

2. The method as claimed in claim 1, in which manufacturing the wax pattern comprises injecting a liquid wax into an intermediate mold and then hardening the wax and, before injecting the liquid wax, arranging the at least one ceramic insert in the intermediate mold such that, after the wax has hardened, the insert is arranged around at least a portion of the feed channel pattern.

3. The method as claimed in claim 1, in which the insert comprises a body in the form of a ring surrounding the feed channel pattern.

4. The method as claimed in claim 3, in which the body of the insert has an inner diameter equal to an outer diameter of the feed channel pattern intended to form the feed channel of the shell mold.

5. The method as claimed in claim 3, in which an axial length of the body of the insert is substantially equal to half an axial length of the feed channel pattern around which the insert is arranged, along a central axis of the feed channel pattern.

6. The method as claimed in claim 3, in which an inner wall of the body of the insert comprises a neck.

7. The method as claimed in claim 3, in which the insert comprises at least one annular anchoring bead arranged around the body of the insert.

8. The method as claimed in claim 7, in which the anchoring bead is arranged at an axial end of the body of the insert, or in an intermediate position between two axial ends of the body of the insert.

9. The method as claimed in claim 7, in which the anchoring bead has a straight portion extending radially from the body of the insert, and a toroidal portion arranged around the straight portion.

10. The method as claimed in claim 7, in which the anchoring bead extends radially from the body of the insert by at least 3 mm.

11. The method as claimed in claim 1, in which the ceramic insert is manufactured by additive manufacturing.

12. The method as claimed in claim 1, in which the shell mold is intended for manufacturing a cluster of metal turbomachine parts, the shell mold being axisymmetric about a central axis and comprising a plurality of molding cavities each intended to mold one of the metal parts, the feed channel comprising a central feed channel descending along the central axis of the mold and configured to receive molten metal at a top end, and a plurality of source feed ducts each bringing a bottom end of the central feed channel into fluid communication with a base of each of the molding cavities, a plurality of ceramic inserts being arranged in the intermediate mold such that, after the wax has hardened, each of the inserts is arranged around at least a portion of a source feed duct pattern around which one of the source feed ducts of the shell mold is intended to be formed.

13. A shell mold intended for manufacturing a metal turbomachine part, obtained by a method as claimed in claim 1.

14. A method for manufacturing metal turbomachine parts using a shell mold obtained by a method as claimed in claim 1.

* * * * *